(12) United States Patent
Choi et al.

(10) Patent No.: US 8,675,151 B2
(45) Date of Patent: Mar. 18, 2014

(54) DISPLAY APPARATUS

(75) Inventors: Moongoo Choi, Seoul (KR); Chilkeun Park, Seoul (KR); Hyouk Kwon, Seoul (KR); Sangcheon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 185 days.

(21) Appl. No.: 12/955,489

(22) Filed: Nov. 29, 2010

(65) Prior Publication Data

US 2011/0261286 A1 Oct. 27, 2011

Related U.S. Application Data

(60) Provisional application No. 61/377,397, filed on Aug. 26, 2010, provisional application No. 61/334,380, filed on May 13, 2010.

(30) Foreign Application Priority Data

Apr. 21, 2010 (KR) .......................... 10-2010-0036916
Jun. 22, 2010 (KR) .......................... 10-2010-0059279

(51) Int. Cl.
*G02F 1/1335* (2006.01)
(52) U.S. Cl.
USPC ............................................ 349/64; 362/612

(58) Field of Classification Search
None
See application file for complete search history.

(56) References Cited

U.S. PATENT DOCUMENTS

2004/0227871 A1* 11/2004 Wu et al. ......................... 349/64
2011/0051037 A1* 3/2011 Kim et al. ....................... 349/62

FOREIGN PATENT DOCUMENTS

| JP | 2004-349251 A | 12/2004 |
| JP | 2006-209120 A | 8/2006 |
| JP | 2007-180021 A | 7/2007 |
| KR | 10-2006-0018522 A | 3/2006 |

* cited by examiner

*Primary Examiner* — Thanh-Nhan P Nguyen
(74) *Attorney, Agent, or Firm* — Birch, Stewart, Kolasch & Birch, LLP

(57) ABSTRACT

A display apparatus is provided and includes a display panel, and a backlight unit supplying light from a rear of the display panel. The backlight unit includes a light source, a circuit board layer, a reflection layer, a pattern layer, and a vacant layer. The circuit board layer has the light source seated thereon. The reflection layer is formed on the circuit board layer to reflect light emitted from the light source. The pattern layer is positioned on a top surface of the light source. The vacant layer is formed between the reflection layer and the pattern layer.

20 Claims, 19 Drawing Sheets

DISPLAY APPARATUS

CROSS REFERENCE TO RELATED APPLICATIONS

This nonprovisional application claims the benefit of U.S. Provisional Application No. 61/377,397 filed on Aug. 26, 2010, and 61/334,380 filed on May 13, 2010 and to Patent Application No. 10-2010-0059279 filed in Republic of Korea, on Jun. 22, 2010, and 10-2010-0036916 filed in Republic of Korea, on Apr. 21, 2010. The entire contents of all of the above applications are hereby incorporated by reference.

BACKGROUND

Embodiments relate to a display apparatus.

With the merits of small size, light weight, low power consumption, etc., LCD (liquid crystal display) devices are being diversely used in many fields, including the notebook PC and monitor markets.

An LCD device includes a liquid crystal panel and a backlight unit. The backlight unit supplies light to the liquid crystal panel, and the light is transmitted through the liquid crystal panel. Here, the liquid crystal panel controls the transmissivity of light to reproduce an image.

Backlight units may be categorized into edge-type and direct-type units according to the arrangement of the light sources. An edge-type light source is disposed at an edge of the liquid crystal panel, and a light guiding plate is disposed at the rear surface of the liquid crystal panel to guide light supplied from the edge of the liquid crystal panel toward the rear surface of the liquid crystal panel. A direct-type backlight has a plurality of light sources disposed directly behind the rear surface of the liquid crystal panel, and the light emitted from the plurality of light sources is supplied directly to the rear surface of the liquid crystal panel.

Light sources used may include EL (electro luminescence), CCFL (cold cathode fluorescent lamp), HCFL (hot cathode fluorescent lamp), and LED (light emitting diode) light sources. Among these, LEDs are favored for having low power consumption and outstanding light emitting efficiency.

SUMMARY

An aspect of the present invention provides a display apparatus capable of achieving good luminance and color uniformity without using a light guiding layer configuring a backlight unit.

According to at least one of embodiments, a display apparatus includes a display panel, and a backlight unit supplying light from a rear of the display panel, wherein the backlight unit includes: a light source; a circuit board layer on which the light source is seated; a reflection layer formed on the circuit board layer, for reflecting light emitted from the light source; a pattern layer positioned on a top surface of the light source; and a vacant layer formed between the reflection layer and the pattern layer.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings.

Figure 1:
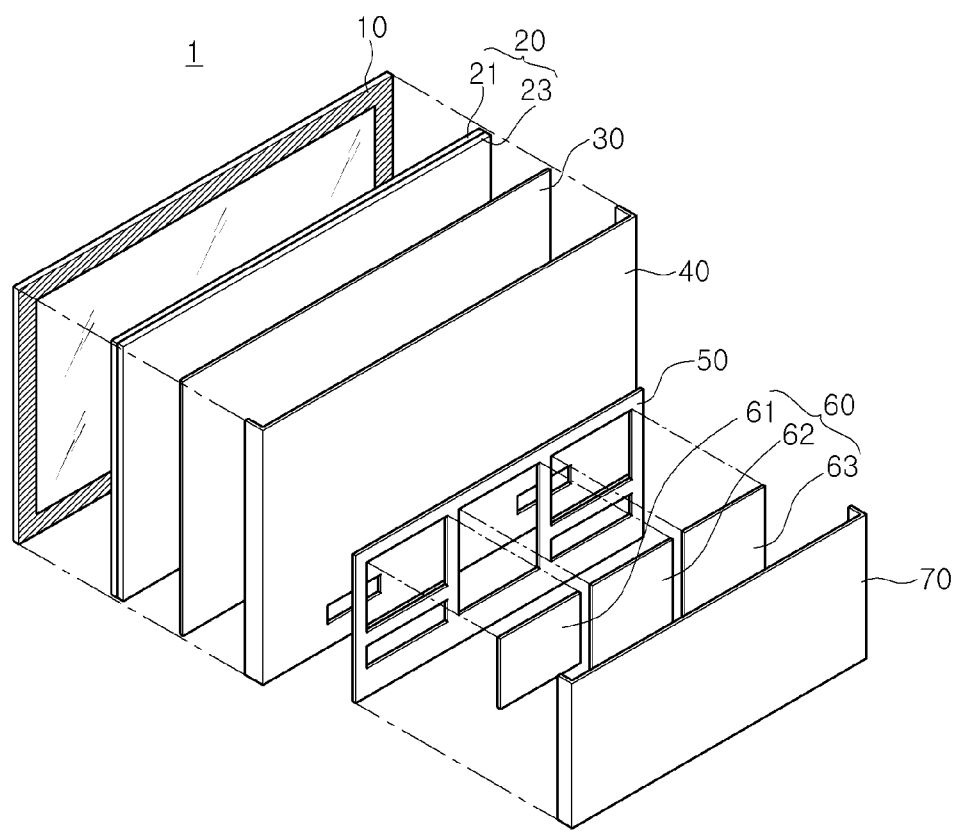
FIG. 1 illustrates an exploded perspective view of a display apparatus according to an embodiment.

FIG. 1 illustrates an exploded perspective view of a display apparatus according to an embodiment.

Referring to FIG. 1, a display apparatus 1 according to an embodiment includes a front cover 10, a display module 20 provided on the reverse side of the front cover 10, a heat dissipation member 30 provided on the reverse side of the display module 20, a back cover 40 housing the display module 20 and the heat dissipation member 30, a driving unit 60 coupled to the reverse surface of the back cover 40, a chassis 50 for fixing the driving unit 60 to the back cover 40, and a driving unit cover 70 covering the driving unit 60.

In detail, the display module 20 includes a display panel 21 for reproducing an image, and a backlight unit 23 for supplying light from the reverse surface of the display panel 21 forward. The driving unit 60 disposed on the reverse surface of the back cover 40 may include a power supply 61, a mainboard 62, and a drive controller 63. The driving unit 60 may also be fixed to the reverse surface of the back cover 40 by means of the chassis 50. The drive controller 63 may be a timing controller to control the drive timing of each driving circuit of the display panel 21. The mainboard 62 is a portion that transfers V-Sync, H-Sync, and R,G,B resolution signals to the timing controller, and the power supply 61 is a portion that applies current to the display panel 21 and the backlight unit 22. The driving unit 60 may also be enclosed by the driving unit cover 70 to be shielded from the outside.

The heat dissipation member 30 is interposed between the display module 20 and the back cover 40, and may improve the heat dissipating effectiveness of heat generated from the display module 20 and the driving unit 60.

The front cover 10 defines an opening of a predetermined size therein, and may be formed in a rectangular band shape having a predetermined width, or may be formed as a rectangular plate that covers the entire front surface of the display module 20. In the former case, not only does it shield the front edges of the display module 20 that do not output an image, but also prevents damage of the edge portions of the display module 20 from external forces. In the latter case, where it is a plate of a transparent material that transmits light, the front cover 10 may be a plastic panel formed by injection compression molding a resin or compressed tempered glass. An opaque film layer or coating layer may enclose the edges of the front cover 10 so that light is not emitted and the edge portions of the display module 20 can be covered.

Below, a detailed description on the structure of the display module 20 and the structure of the driving unit 60, with reference to diagrams will be provided.

Figure 2:
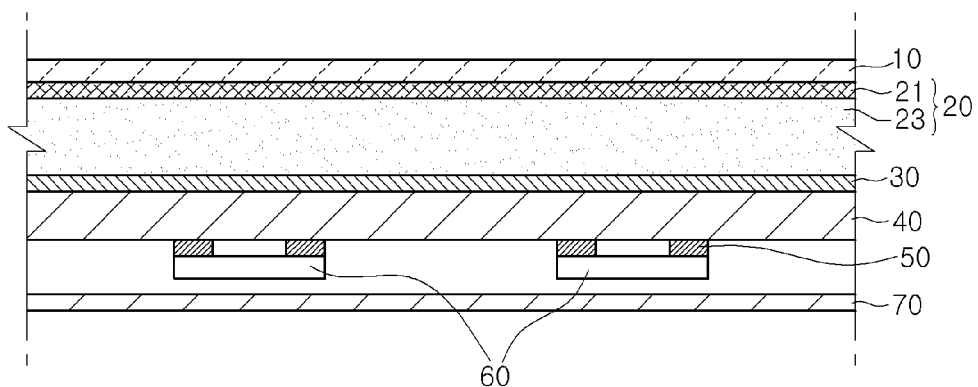
FIG. 2 is a sectional view schematically illustrating the structure of a display apparatus according to an embodiment.

FIG. 2 is a sectional view schematically illustrating the structure of a display apparatus according to an embodiment.

Referring to FIG. 2, the front cover 10 is positioned at the foremost position (the highest position in the drawing), and to the rear thereof, the display module 20, the heat dissipation member 30, and the back cover 40 are coupled. The driving unit 60 is coupled to the reverse surface of the back cover 40 by means of the chassis 50. The driving unit 60 is covered by the driving unit cover 70.

The display module 20 includes a display panel 21 and a backlight unit 23.

Figure 3:
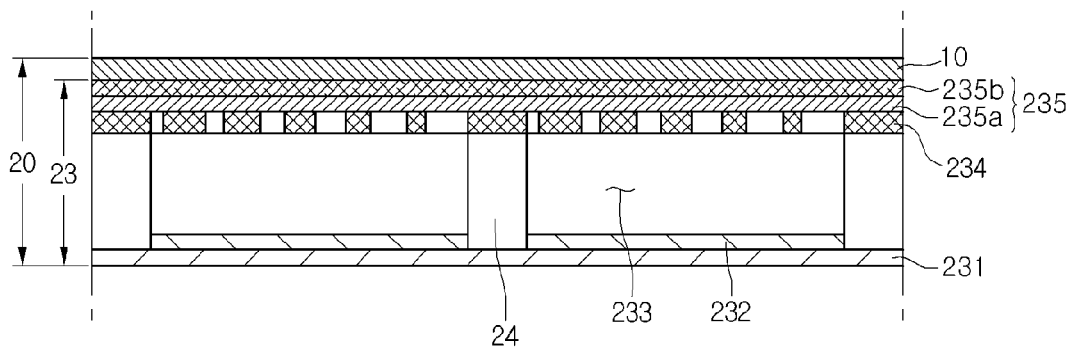
FIG. 3 is a sectional view illustrating the structure of a display module according to an embodiment in detail.

FIG. 3 is a sectional view illustrating the structure of a display module according to an embodiment in detail.

Referring to FIG. 3, a display module 20 according to an embodiment includes a display panel 21 and a backlight unit 23.

In detail, as a portion for reproducing an image, the display panel 21 has a polarizing plate positioned at the front surface (the upper surface in the drawing) thereof, and a plurality of substrates are interposed therebetween. One of the plurality of substrates is referred to as a TFT (Thin Film Transistor) array substrate and may be defined into a plurality of pixels formed to intersect in a matrix of a plurality of scan lines and data lines. A TFT capable of turning a signal ON/OFF is provided on each pixel, and a pixel electrode may be positioned to connect each TFT. Another of the plurality of substrates may be referred to as a color filter substrate that includes red (R), green (G), and blue (B) color filters for each pixel, scan lines and data lines surrounding the same, and a black matrix covering the edges of non-display devices such as a TFT. A gate driver and data driver may also be provided at the edges of the display panel 21 to generate a driving signal for driving the display panel 21.

The backlight unit 23 according to the embodiment is positioned on the reverse surface (bottom in the drawing) of the display panel 21.

In detail, the backlight unit 23 includes (from the lowermost layer in the drawing) a circuit board layer 231 including a PCB substrate, a plurality of light sources 24 mounted on the circuit board layer 231, a reflection layer 232 formed on the top surface of the circuit board layer 231, a PMR (Patterned Metal Reflection) layer 234 separated from the reflection layer 232 on the top surfaces of the light sources 24, and a diffusion layer 235 positioned on a top of the PMR layer.

The light sources 24 may be one of an LED (Light Emitting Diode) and an LED package provided with at least one LED chip. In the present embodiment, an LED package is exemplarily described as the light source 24.

An LED package configuring the light source 24 may be categorized into a top view type or a side view type according to the direction in which the light emitting surface is disposed, and the light source 24 according to a first embodiment may be configured using at least one of a top view type LED package in which the light emitting surface is disposed upward and a side view type LED package in which the light emitting surface is disposed toward a side.

To describe the light source 24 of the present embodiment as a side view type LED package, each light emitting surface of the plurality of light sources 24 is disposed at a side, where light may be emitted in a side surface direction, or a direction parallel to the circuit board layer 231. Accordingly, the backlight unit 23 and also the display apparatus 1 may be configured to be slim.

The light source 24 may be configured with a color LED that emits light of at least one color from among colors such as red, blue, and green, or with a white LED. Also, the color LED may include at least one of a red LED, a blue LED, and a green LED, and the arrangement and emitted light of such LEDs may be modified and applied in various ways.

The display panel 21 may simply be positioned on the diffusion layer 235, or may be attached thereto by means of an adhesive layer. The diffusion layer 235 may diffuse light emitted from the light sources 24 upward—that is, toward the display panel 21. The diffusion layer 235 may also be provided in an optical sheet configuration. For example, the optical sheet may be configured with one or more diffusion sheets 235a and one or more prism sheets 235b that are stacked. Here, the diffusion layer 235, or the plurality of sheets configuring the optical sheet may be provided in an adhered state or a pressed-together state without spaces therebetween in order to reduce the thickness of the backlight unit 23. The diffusion layer 235 may not only be provided in a configuration in which the prism sheet 235b and diffusion sheet 235a are coupled, but may be provided with only one or a plurality of diffusion sheets 235a, or any one or a plurality of prism sheets 235b. In addition, the diffusion layer 235 may further include various functional layers other than the prism sheet 235b and the diffusion sheet 235a. The diffusion sheet 235a diffuses incident light to prevent regional concentration of light emitted from the light source and make the brightness of light more uniform. Further, the prism sheet 235b may focus the light emitted from the diffusion sheet 235a to cause light to be perpendicularly incident to the display panel 21.

A vacant layer 233 filled with air or a vacuum state is formed and maintained between the reflection layer 232 and the PMR layer. While in a conventional backlight unit, a light guiding layer of resin material is provided to diffuse and reflect light radiated from a light source 24, the resin material light guiding layer is omitted from embodiments. With a display apparatus that requires the provision of a separate light guiding plate, there are limitations to how much the thickness, weight, and manufacturing cost of the display module can be reduced.

Instead of the commonly used screening layer, an embodiment applies a PMR layer, and instead of a light extraction layer provided on the top surface of the circuit board layer 231, an embodiment applies the reflection layer 232 on which a metallic reflection material having uniform reflectivity and high reflectivity is applied. Accordingly, light emitted from a light source is repeatedly reflected between the reflection layer 232 and the PMR layer 234 to effectively propagate light. Because a reflective region and a transmission region (described below) are formed on the PMR layer 234, light meeting the reflection region undergoes specular reflection with the reflection layer 232, and light meeting the transmission region is transmitted through the PMR layer 234 and propagated to the diffusion layer 235. Instead of a metal sheet for specular reflection, the reflection layer 232 may be a dielectric multi-layer formed of a plurality of materials with different reflectivities.

In the case of a backlight unit provided with a separate light guiding layer and screening layer, total reflection occurs at the interface of the light guiding layer and the screening layer. That is, when light from a material with a high index of refraction is incident on light with a low index of refraction, light that is incident at an angle greater than a critical angle is not refracted and is entirely reflected. Thus, a reduction in light distribution uniformity occurs. Therefore, in order to minimize this limitation, patterns that scatter light within a light guiding layer are additionally required. That is, light scattering particles are either introduced into the light guiding layer, or a reflection pattern is formed on the top surface of the circuit board layer, and a light extraction layer positioned on the top surface of the circuit board layer is formed of a white reflection sheet.

In embodiments, however, there is no need to form a separate light guiding layer. That is, because the region where a light guiding layer is introduced is maintained in an air layer or vacuum layer state, total reflection from a difference in indices of refraction does not occur. Only reflection and transmission of light occurs at the PMR layer 234, and total reflection does not occur, so that no color limitations occur. Also, because the ratio of the transmission region to the reflection region formed on the PMR layer 234 is mathematically controlled to be suitable, the distribution of transmitted light can be controlled. Conversely, in the case of a display module configured with a separate stacked screening layer and light guiding layer, even if the transmission/reflection region sizes (or ratio) of the screening portion are controlled, it is actually difficult to control light so that a desired amount of light is transmitted or reflected due to the occurrence of total reflection.

Figure 4:
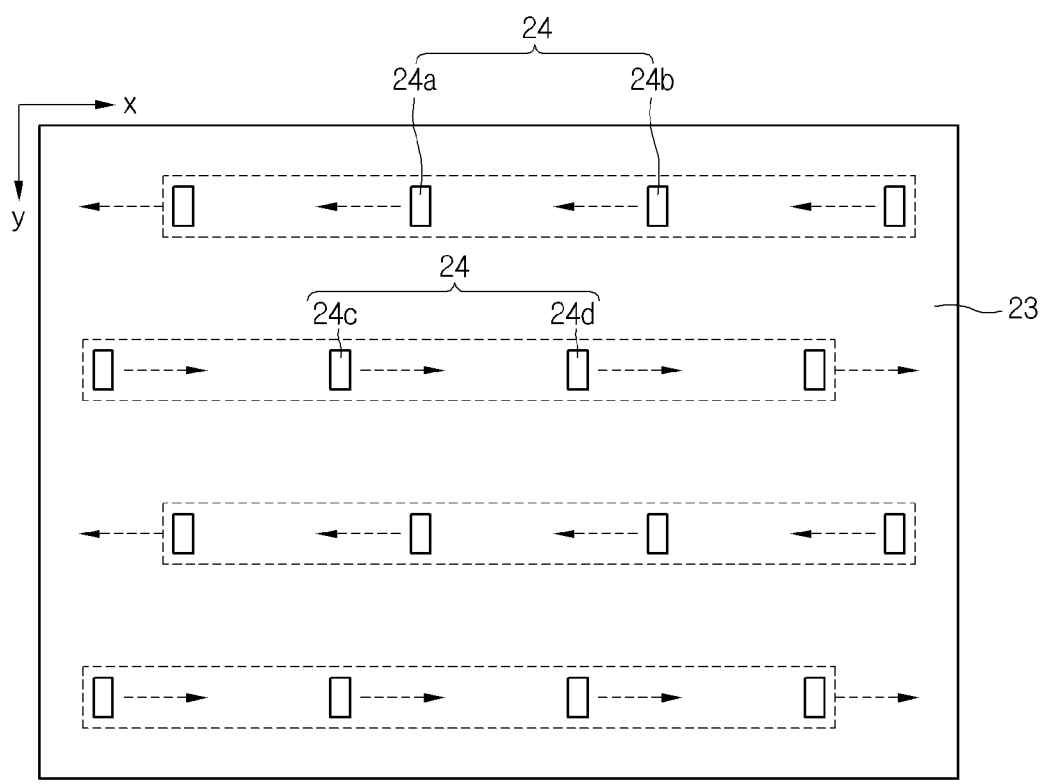
FIG. 4 illustrates a plan view of a reflection layer configuring a backlight unit according to an embodiment.

FIG. 4 illustrates a plan view of a reflection layer configuring a backlight unit according to an embodiment.

Referring to FIG. 4, a backlight unit 22 may include 2 or more light sources that emit light in mutually different directions.

That is, light sources 24a and 24b included in a first light source array and light sources 24c and 24d included in a second light source array may emit light in mutually different directions. In other words, the direction in which the light emitting surfaces of the light sources 24a and 24b of the first light source array face is different from the direction in which the light emitting surfaces of the light sources 24c and 24d of the second light source array face. In this case, the light sources provided on the backlight unit 22 may respectively emit light in a lateral direction, for which a side view type LED package may be used.

As shown in the drawing, the plurality of light sources provided on the backlight unit 22 may be arranged to form 2 or more rows, and 2 or more light sources arranged in the same row may emit light in the same direction.

Figure 5:
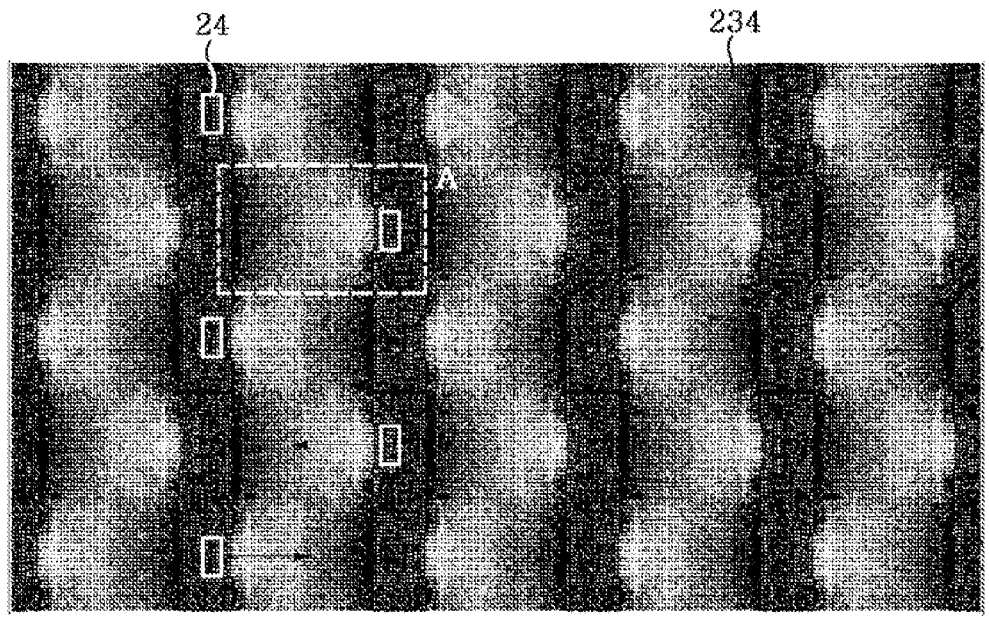
FIG. 5 illustrates a plan view of a PMR layer according to an embodiment.
Figure 6:
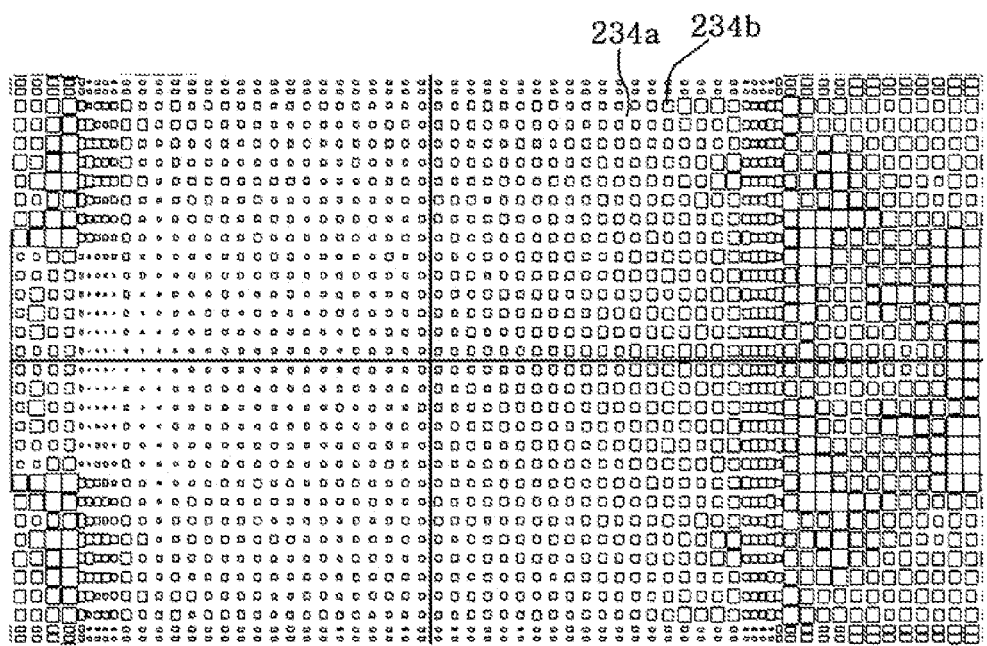
FIG. 6 illustrates an enlarged view of region A in FIG. 5.

FIG. 5 illustrates a plan view of a PMR layer according to an embodiment, and FIG. 6 illustrates an enlarged view of region A in FIG. 5.

Referring to FIGS. 5 and 6, a PMR layer 234 according to an embodiment has a reflection region 234a and a transmission region 234b.

In detail, the PMR layer 234 may be a reflection/transmission modulation film with a consolidated reflection region 234a and transmission region 234b. Also, the reflection region 234a is coated with a metallic reflection material capable of specular reflection, so that light meeting the reflection region 234a is reflected at the same angle as the incident angle. Because the transmission region 234b is a transparent region capable of transmitting light, light relayed through the transmission region 234b is transmitted straight through the PMR layer 234 to the diffusion layer 235.

As shown in the diagrams, the light transmission region 234b may have a 2 dimensional circular shape with a predetermined area, and a plurality of such light transmission regions 234b may be combined to form a certain pattern. The pattern may be formed irregularly, or may be formed in regular repetition, as shown in FIG. 4. Also, by adequately controlling the area ratio of the reflection region 234a and the transmission region 234b, light transmissivity may be controlled. Additionally, the form of the transmission region 234a pattern, or the size of individual transmission regions 234b may be controlled to obtain brightness uniformity. For example, the size of individual transmission regions 234b in an adjacent region may be made small to reduce the area of the transmission pattern and prevent the occurrence of hot spots. Conversely, the area of the transmission pattern may be increased as the distance from the light sources increases, to increase the amount of light transmitted and achieve uniformity across the entire area of the display panel.

In the present embodiment, an example is provided of forming the PMR layer 234 by perforating regions of the metallic reflection sheet for specular reflection that correspond to the transmission regions 234b. That is, the transmission regions 234b are formed in the form of through-holes, so that light incident on the transmission regions 234b passes directly through to the diffusion layer 235. A portion of light that reaches the diffusion layer 235 may progress toward the display panel 21, and a portion may be reflected back to the reflection layer 232. The light guiding or light propagation processes for light emitted from the light sources will be discussed in detail below with reference to drawings.

Thus, a backlight unit configuration according to embodiments, that is, a metallic reflection sheet for specular reflection and a PMR layer 234 performing only a transmission function, is provided, with a vacant layer 233 of an air layer or vacuum layer formed therebetween, and light emitted from light sources is diffused in lateral directions of the display module through reflection, transmission, and re-reflection processes. Also, total reflection does not occur at the interface of the vacant layer 233 and the PMR layer 234.

Figure 7:
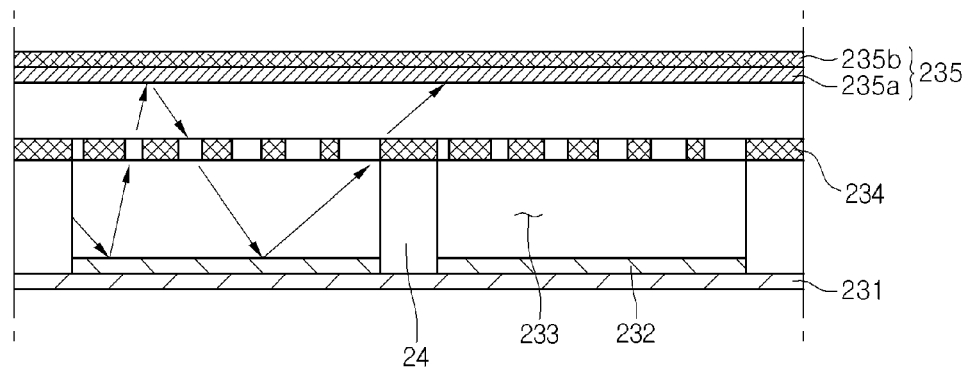
FIG. 7 illustrates a path in which light travels within a display module according to an embodiment.

FIG. 7 illustrates a path in which light travels within a display module according to an embodiment.

Referring to FIG. 7, light emitted from the light source 24 is diffused at a predetermined orientation angle. A portion of light emitted from the light source 24 is reflected at the diffusion layer 232 and progresses to the PMR layer 234. Here, the light that meets the diffusion layer 234 undergoes specular reflection at the same angle as the angle of incidence. Also, the light that meets the reflection region 234a from the light that progresses to the PMR layer 234 is specularly reflected and is re-incident to the reflection layer 232. Through this reflection and re-reflection, light is propagated horizontally from the light sources. The light that reaches the transmission region 234b from the light progressing to the PMR layer passes through the PMR layer 234 and progresses to the diffusion layer 235. A portion of the light progressing to the diffusion layer 235 moves to the display panel 21, and a portion is re-reflected back to the vacant layer 233. Because the size of the transmission region 234b is increased as the distance from the light source 24 increases, and the gaps between adjacent transmission regions 234b are made small, light emitted from the light sources 24 may be uniformly distributed across the entire display panel.

Figure 8:
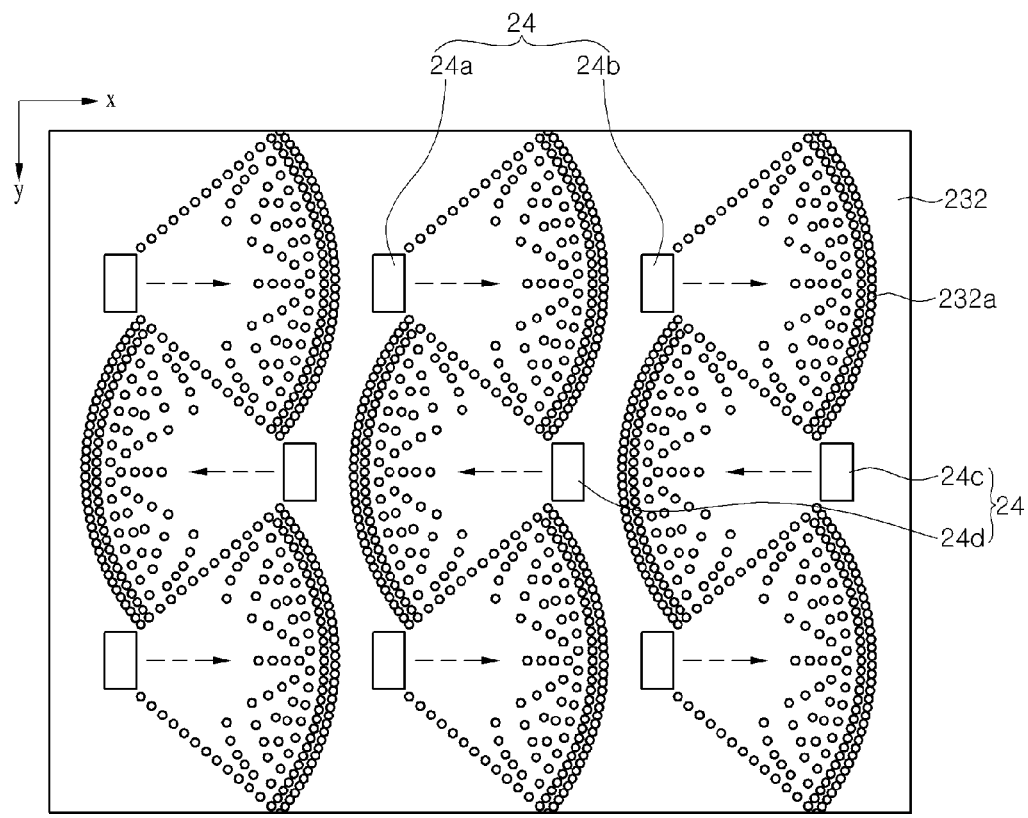
FIG. 8 illustrates a plan view of a reflection layer configuring a backlight unit according to an embodiment.
Figure 9:
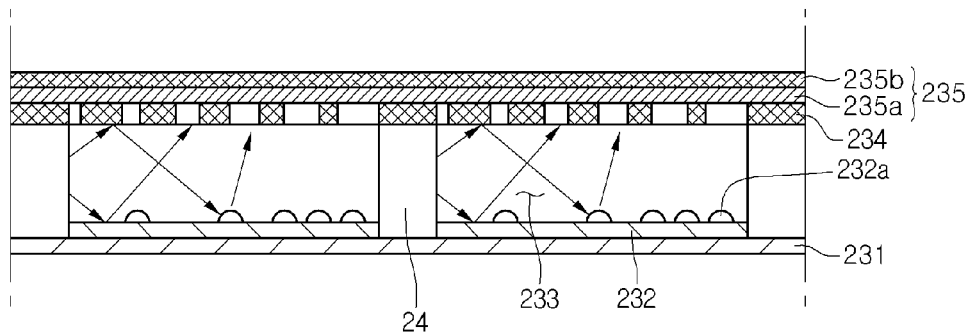
FIG. 9 illustrates a path in which light travels within a backlight unit with a PMR layer according to an embodiment.

FIG. 8 illustrates a plan view of a reflection layer configuring a backlight unit according to an embodiment, and FIG. 9 illustrates a path in which light travels within a backlight unit with a PMR layer according to an embodiment.

Referring to FIGS. 8 and 9, a plurality of light sources 24 are arranged at regular intervals on the top surface of the circuit board layer 231 configuring the backlight unit 23 according to an embodiment, and a reflection layer 232 having a reflective material applied is formed on portions other than those where the light sources 24 are disposed.

In a backlight unit structure provided with a separate light guiding layer, a white light extraction layer and metal pattern are usually formed on the top surface of the circuit board layer, or conversely, a white pattern is formed on a metal reflection sheet. Here, when the light extraction layer is either formed with a white reflection sheet and metallic reflection pattern, or a metallic reflection sheet and a white reflection pattern, color limitations can arise due to mixed materials. In particular, with a white reflection sheet, light is scattered, and hot spots may occur in regions around the light sources.

The present embodiment is characterized by a reflection layer 232 of a metal sheet for specular reflection or a dielectric multi-layer, formed on the top surface of a circuit board layer. Accordingly, light emitted from the light sources 24 in a lateral direction to the display module 20 diffuses at an orientation angle. A portion of the progressing light meets the reflection layer 232 and is specularly reflected. Because the reflection layer 232 is a metal reflection sheet, light is reflected at the same angle as the incident angle. Another portion of the progressing light directly meets the PMR layer 234. A portion of the light that meets the PMR layer 234 meets the reflection region 234a and is specularly reflected, and a portion passes the transmission region 234b to move toward the display panel 21. That is, the light emitted from the light sources 24 is repeatedly reflected between the reflection layer 232 below and the PMR layer 234 above, and is propagated horizontally within the vacant layer 233. During this propagation process, the light passes the transmission region 234b of the PMR layer 234 and moves in a frontward direction. Accordingly, by controlling the area ratio of the transmission region 234b and reflection region 234a formed on the PMR layer 234, the amount of light radiated toward the display panel 21 can be controlled. Also, by suitably setting a pattern of the transmission region 234b and controlling the amount of transmitted light, the brightness of light can be controlled.

As described above, because total reflection does not occur at the border region of the vacant layer 233 and the PMR layer 234 and the border region of the vacant layer 233 and the reflection layer 232, uniformity of light distribution is improved.

As shown in the drawings, in order to increase the amount of light that moves toward the display panel 21, or towards the front surface of the display apparatus and is transmitted through the PMR layer 234, a reflection pattern 232a for changing the reflected angle of light may be formed in the reflection layer 232. The reflection pattern 232a may be formed of the same material as that of the reflection layer 232. That is, it may be formed of a metallic reflection sheet or dielectric multi-layer configuration.

According to the above structure, through specular reflection, light moving horizontally in the drawing is reflected at an angle different from the incident angle when meeting the reflection pattern 232a. As a result, a portion of light having an orientation angle and obliquely incident is reflected in the direction of the display panel 21, and the amount of light that passes through the PMR layer 234 can be increased.

The reflection pattern 232a may be formed with a certain distance and gap, but is not limited thereto. In another embodiment, a plurality of reflection patterns 232a may be formed on the reflection layer 232, and the distances between adjacent reflection patterns 232a may be reduced as the distance from the light sources 24 increases. Further, the reflection pattern 232a may be formed of a shape that widens (for example, in a triangular shape or fan shape) as it becomes more distant from the light sources.

As shown in FIG. 8, in order to facilitate the progress of light emitted from the light sources 24 toward adjacent light sources, a plurality of reflection patterns 232a may be formed. The reflection patterns 232a reflect light emitted from the light sources 24 at various angles different from the incident angle, to move the light toward the display panel 21. In other words, the light emitted laterally from the light sources may be extracted and moved toward the display panel 21.

To provide a more detailed description, the backlight unit 23 may include 2 or more light source arrays to emit light in mutually different directions. That is, a first light source array including a first light source 24a and a second light source 24b arranged in a +X-axis direction in the diagram, and a second light source array including a third light source 24c and a fourth light source 24d arranged in a Y-axis direction may be arranged multiply in alternation.

Thus, by forming light emitting directions of the first light source array and the second light source array in mutually opposite directions, the concentrating or weakening of light brightness at certain regions of the backlight unit 23 can be reduced.

In detail, by arranging a plurality of reflection patterns 232a in the configuration shown, the formation of hot spots at regions close to the light sources or the reduction of brightness at regions distant from the light sources can be prevented. Specifically, by increasing the concentration of reflection patterns 232a away from the directions in which light progresses from the light sources and reducing the gaps between the patterns, reduction of brightness in a region at the rear of an adjacent light source 24b or 24d far away from another light source 24a or 24c can be prevented, to thus be effective in terms of brightness uniformity.

In other words, by forming a small number of reflection patterns 232a in a region close to a light source, the light emitted from the light source 24 is specularly reflected far away by the reflection layer 232. Conversely, by forming a large number of reflection patterns 232a farther away from the light source, the amount of light reflection is increased, and the reflected angles are diversified. Thus, brightness uniformity of light between regions close to the light source and far from the light source can be maintained.

The form and arrangement of the reflection patterns 232a are not limited to those of the present embodiment, and may be made according to various embodiments.

Figure 10:
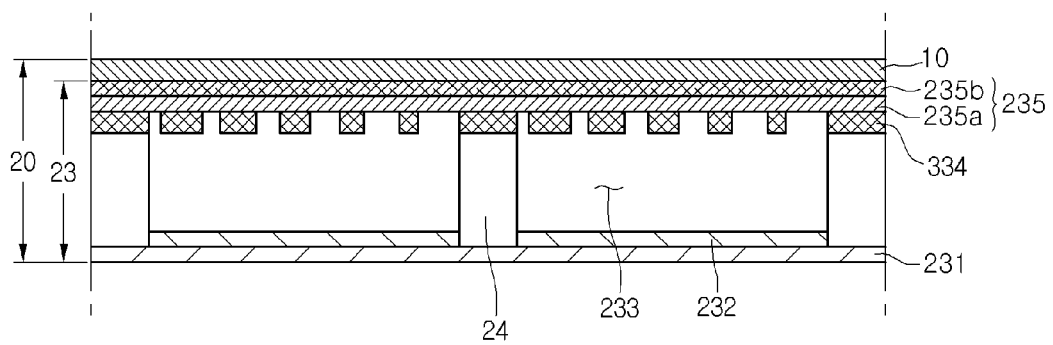
FIG. 10 illustrates a sectional view of a display module according to an embodiment.

FIG. 10 illustrates a sectional view of a display module according to an embodiment.

Referring to FIG. 10, the present embodiment is largely the same as that in FIG. 3, and is different only in the forming method of the PMR layer.

In detail, a PMR layer according to the present embodiment is provided, not in the form of a separate metal sheet, but as a PMR pattern 334 (having the same characteristics as a reflection pattern) formed of a metallic reflective material and formed on the bottom surface (or reverse surface) of the diffusion layer 235. In other words, the portion corresponding to the reflection region 234a in the previous embodiment is formed on the bottom surface of the diffusion layer 235. Accordingly, the PMR pattern 334 may be provided on the bottom surface of the diffusion layer 235 through deposition, coating, or a printing method using metal ink.

Figure 11:
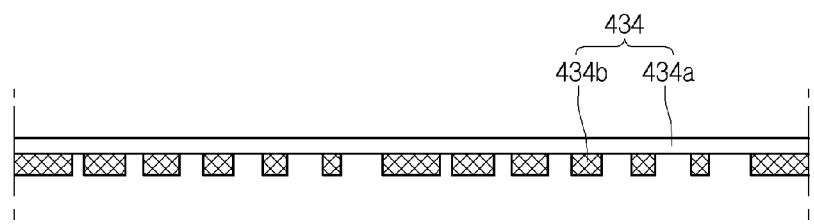
FIG. 11 is a sectional view illustrating a method of forming a PMR layer according to an embodiment.

FIG. 11 is a sectional view illustrating a method of forming a PMR layer according to an embodiment.

Referring to FIG. 11, a PMR layer 434 according to the present embodiment is characterized in being formed with the PMR pattern 434b (or reflection pattern) formed on a transparent film 434a through a deposition, coating, or printing method. In other words, there is a slight difference in that a transparent region perforated and formed on a partial region of a metallic reflection sheet.

Aside from the PMR pattern 434b formed on a transparent sheet, the PMR layer may be formed with a method of removing a reflective material applied on a portion to become a transmissive region in a film having a metallic reflective material entirely deposited thereon. In other words, using photo-lithography, a reflection layer may be disposed on a transparent film, and a reflective material for forming a transmissive region may be removed to form a PMR layer.

Figure 12:
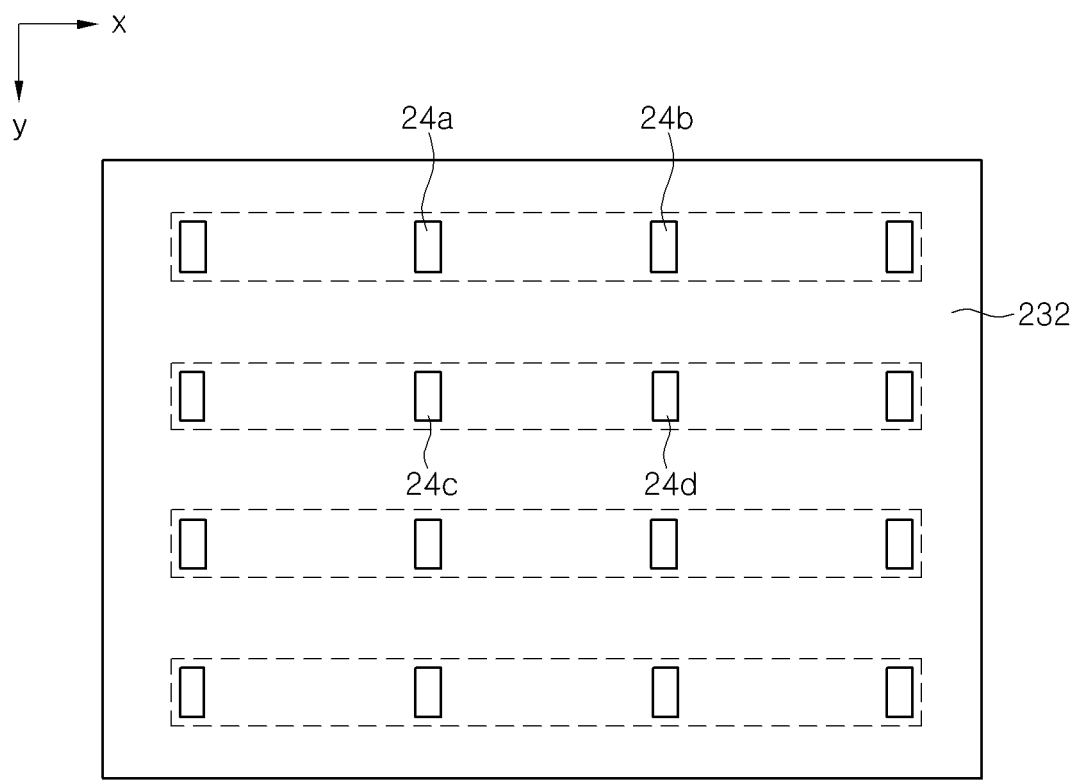
FIG. 12 is a plan view illustrating the arrangement of light sources in a backlight unit according to an embodiment.

FIG. 12 is a plan view illustrating the arrangement of light sources in a backlight unit according to an embodiment.

Referring to FIG. 12, a first light source array and a second light source array may be arranged on the same line in a Y-axis direction. The first light source array and the second light source array may be arranged to radiate light in the same direction or in opposite directions.

Figure 13:
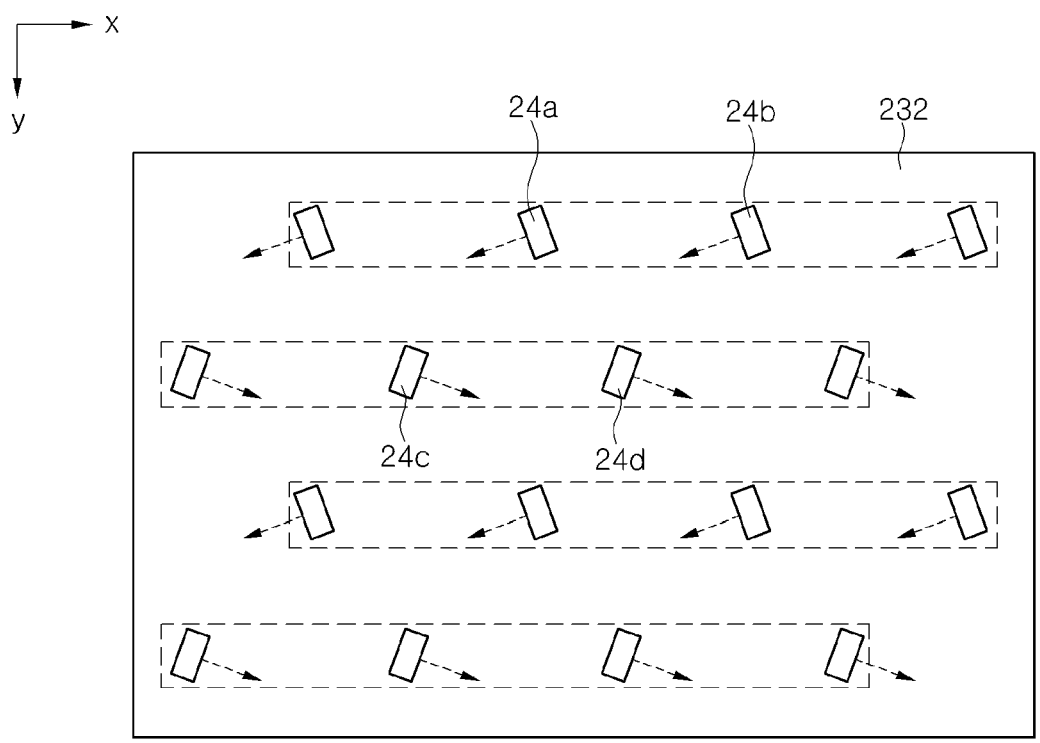
FIG. 13 is a plan view illustrating the arrangement of light sources in a backlight unit according to another embodiment.

FIG. 13 is a plan view illustrating the arrangement of light sources in a backlight unit according to another embodiment.

Referring to FIG. 13, light emitting surfaces configuring a first light source array and a second light source array may be formed at certain angles tilted upward or downward along X-axis direction extension lines.

Figure 14:
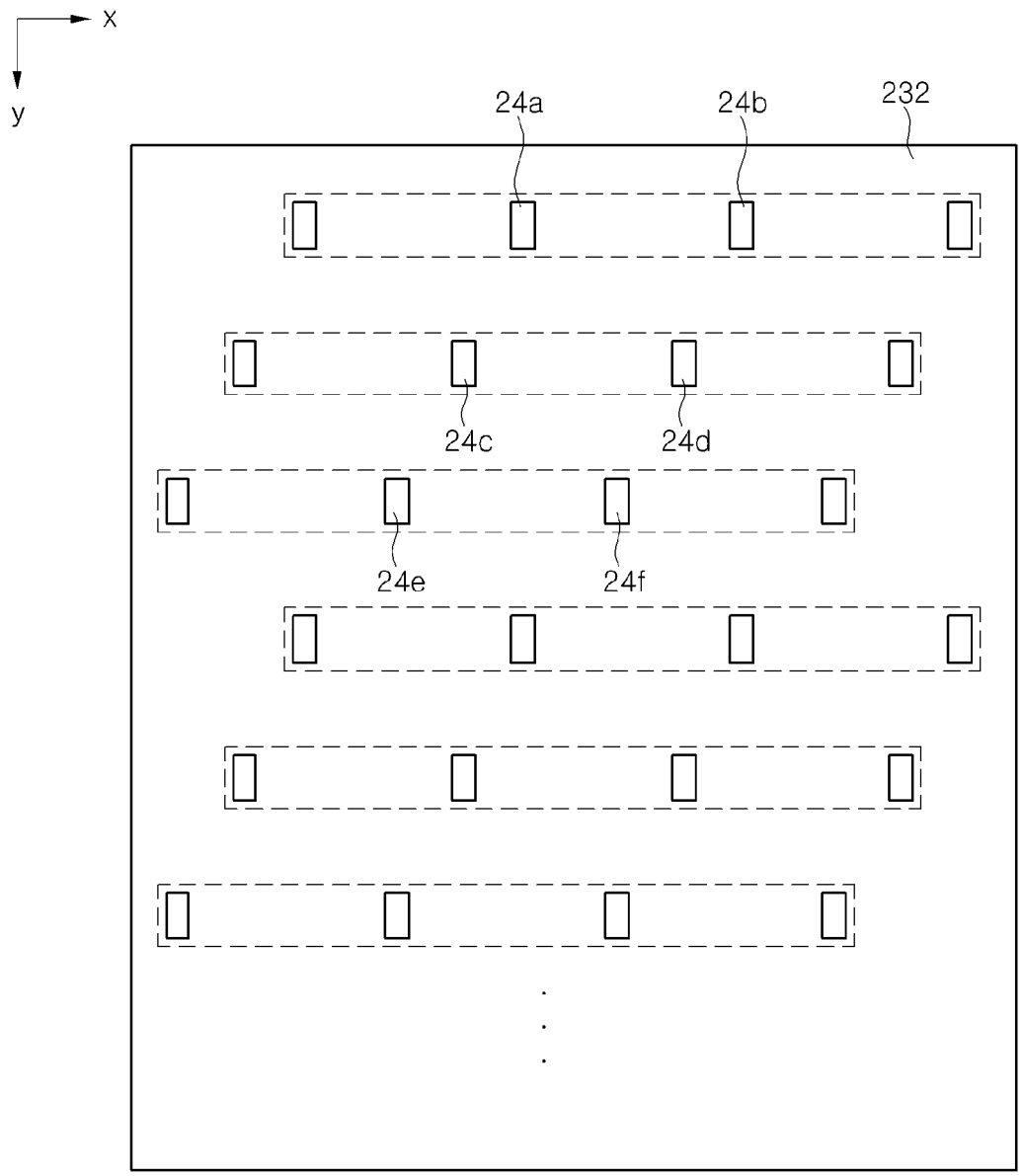
FIG. 14 is a plan view illustrating the arrangement of light sources in a backlight unit according to another embodiment.

FIG. 14 is a plan view illustrating the arrangement of light sources in a backlight unit according to another embodiment.

Referring to FIG. 14, a plurality of light source arrays may be formed separated from each other at mutually different distances with respect to Y-axes.

Specifically, in the present embodiment, a third light source array 24e and 24f is added to a first and second light source array, and light sources 24a, 24c, and 24e configuring the respective light source arrays are separated by mutually different gaps with respect to a Y-axis. That is, a single light source 24a configuring the first light source array from among the light sources 24a, 24c, and 24e configuring the respective light source arrays may be disposed at the farthest point from a Y-axis, and a single light source 24e configuring the third light source array may be disposed at the closest point from the Y-axis.

Figure 15:
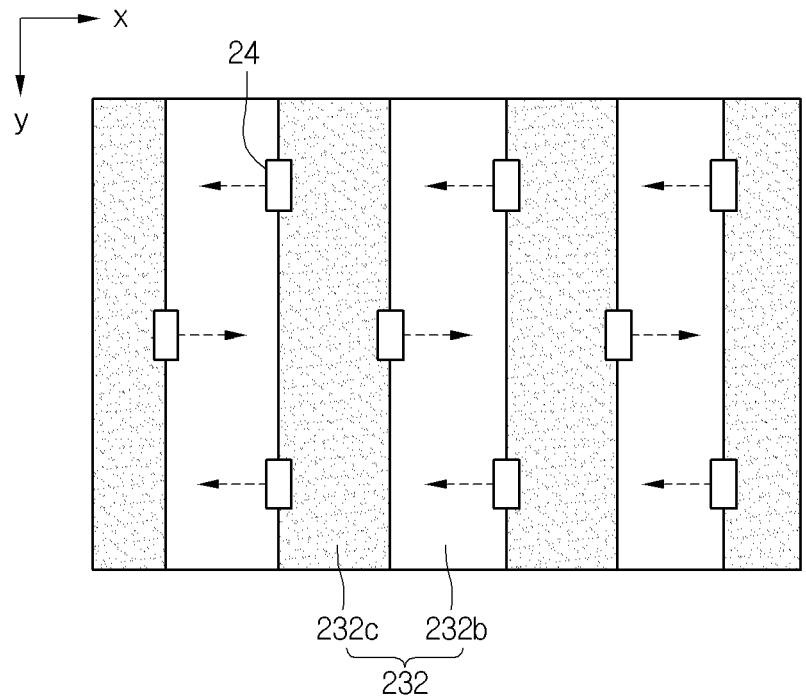
FIGS. 15 and 16 are plan views illustrating the configurations of reflection layers provided on backlight units according to other embodiments.
Figure 16:
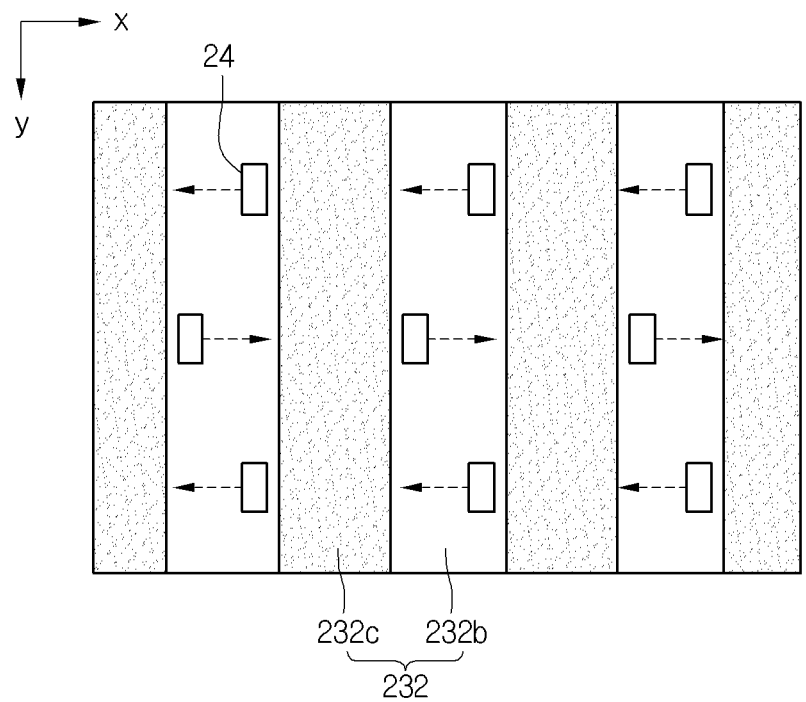

FIGS. 15 and 16 are plan views illustrating the configurations of reflection layers provided on backlight units according to other embodiments.

A reflection layer 232 provided on a backlight unit 22 according to an embodiment may have 2 or more reflectivities—for example, the reflectivity of the reflection layer 232 may be configured differently according to the position formed. That is, the reflection layer 232 may include 2 or more regions having mutually different reflectivities.

Referring to FIG. 15, light sources 24 may be formed at positions overlapping boundary regions between first reflection layers 232b and second reflection layers 232c.

Also, referring to FIG. 16, light sources 24 may be positioned in regions where first reflection layers 232b are formed, spaced a certain distance from the boundary regions between the first reflection layers 232b and second reflection layers 232c.

According to an embodiment, a gradation region may be formed at a boundary region between a first and second reflection layer 232b and 232c with mutually different reflectivities, where the reflectivities gradually increase or decrease.

Also, while not shown, the light sources 24 may, of course, be disposed within the second reflection layer 232c.

Figure 17:
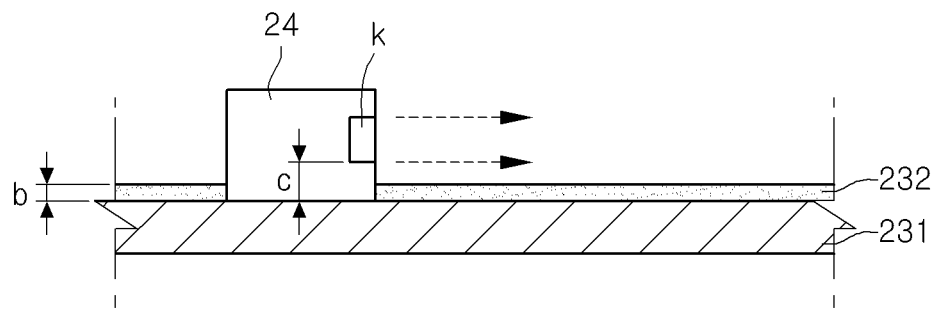
FIG. 17 is a lateral sectional view illustrating the positional relationship between a light source and reflection layer of a backlight unit according to an embodiment.

FIG. 17 is a lateral sectional view illustrating the positional relationship between a light source and reflection layer of a backlight unit according to an embodiment.

Referring to FIG. 17, when a reflection layer 232 is disposed on a top surface of a circuit board layer 231, light emitted from a side surface of a light source 24 is emitted from the reflection layer 232 to the PMR layer 234.

The light source 24 may include a light emitting portion k from which light is radiated, and the light emitting portion k may be disposed at a certain height c from the surface of the circuit board layer 231. Here, a thickness b of the reflection layer 232 may be the same or less than the height c of the light emitting portion k, and accordingly, the light source 24 may be disposed higher than the reflection layer 232.

For example, the thickness c of the reflection layer 232 may be about 0.02 mm to about 0.08 mm. Here, if the thickness c of the reflection layer 232 is greater than 0.02 mm, the reflection layer 232 may have light reflectivity within a reliable range, and if the thickness c of the reflection layer 232 is less than 0.08, light radiated from the light source 24 may be prevented from being lost due to the light emitting portion k of the light source 24 being covered. In order to both improve incidence effectiveness of light radiated from the light source 24 and radiate most of the light incident from the light source 24, the thickness b of the reflection layer 232 may be formed to be about 10 nm to about 100 μm.

Figure 18:
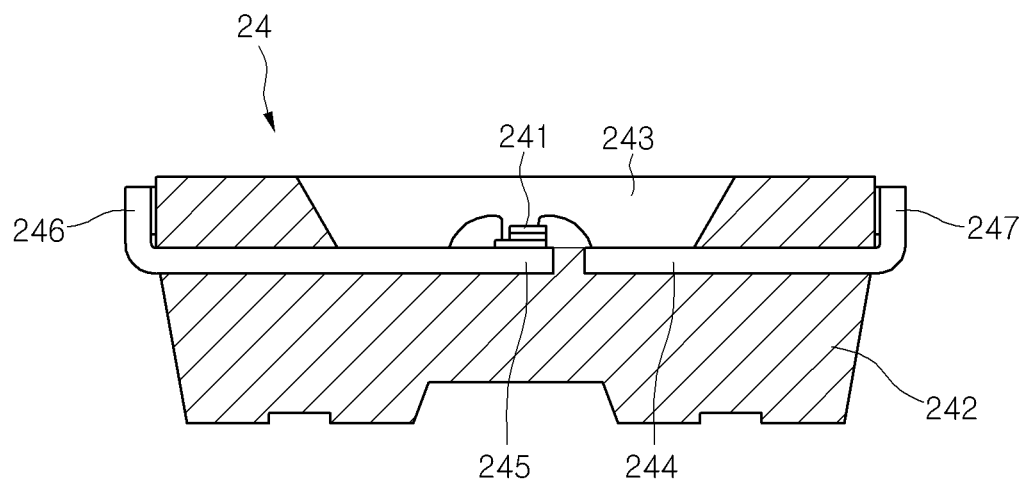
FIG. 18 is a lateral sectional view illustrating the configuration of a light source on a backlight unit.

FIG. 18 is a lateral sectional view illustrating the configuration of a light source on a backlight unit.

Referring to FIG. 18, a light source 24 may be configured to include a light emitting device 241 radiating light, a mold portion 242, and a plurality of lead frames 244 and 245.

In detail, the light emitting device 241 may be an LED chip, and the LED chip may be configured of a blue LED chip or ultraviolet LED chip, or configured as a package combining at least one or more of a red LED chip, a green LED chip, a blue LED chip, a yellow-green LED chip, and a white LED chip. The light emitting device 241 may be categorized as a horizontal type or vertical type device according to configuration. Because a backlight unit radiating light laterally is applied in embodiments, the device applied may be of a vertical type.

Figure 19:
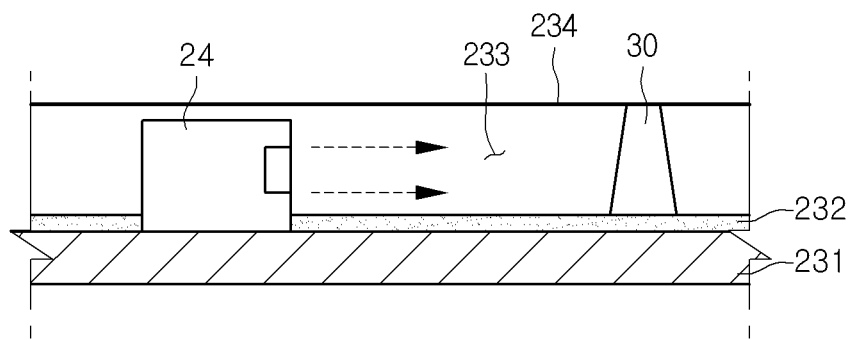
FIG. 19 is a side sectional view illustrating the configuration supporting a PMR layer on a backlight unit according to an embodiment.
Figure 20:
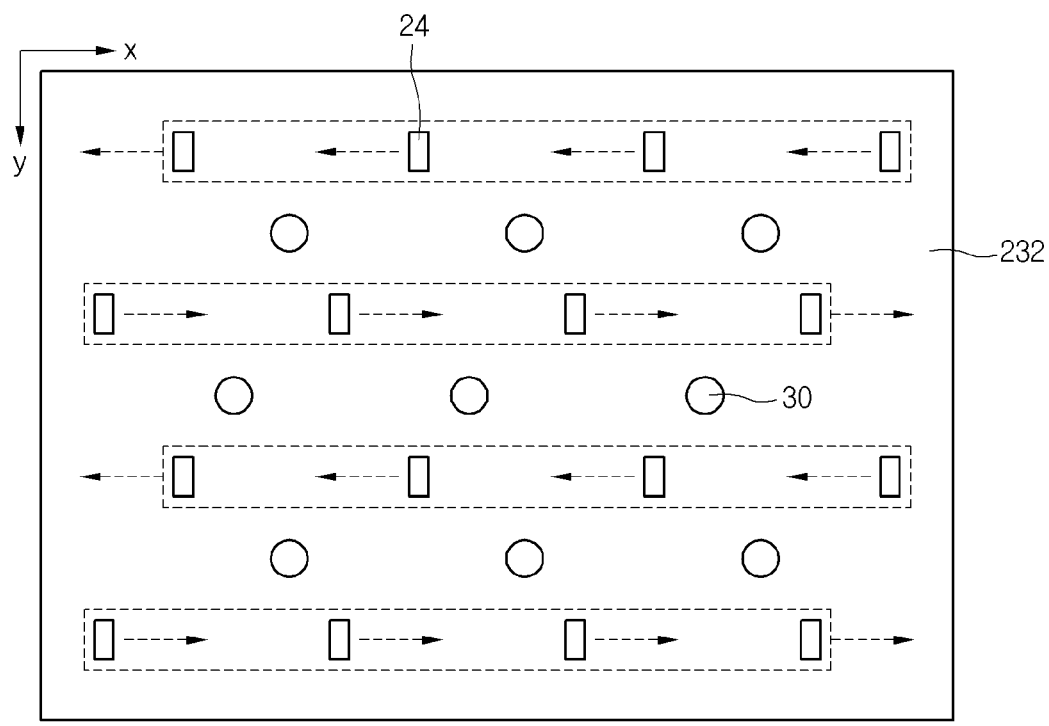
FIG. 20 illustrates a plan view of a backlight unit on which a structure supporting a PMR layer is provided.

FIG. 19 is a side sectional view illustrating the configuration supporting a PMR layer on a backlight unit according to an embodiment, and FIG. 20 illustrates a plan view of a backlight unit on which a structure supporting a PMR layer is provided.

Referring to FIG. 19, a vacant layer 233 is formed between the PMR layer 234 and the reflection layer 232. In other words, a void is formed between the PMR layer 234 and the reflection layer 232, so that the PMR layer 234 can be seen as actually being supported by the light sources 24. While the PMR layer 234 is either pressed against the diffusion layer 235 or manufactured to minimize bending, its tendency to droop toward the vacant layer 233 cannot be ruled out. Accordingly, to obviate this drooping possibility, a plurality of supporting portions 30 may be provided within the vacant layer 233.

In detail, the supporting portion 30 may be formed of a transparent material that allows light to pass through— namely, an optically transmissive material, such as silicon or an acrylic-based resin (PMMA).

The supporting portions 30 may be disposed in spaces between a plurality of light source arrays. If the supporting portion 30 is disposed within a light source array, the light radiated from each light source 24 may be refracted before reaching the reflection layer 232. Then, a portion of the refracted light is unable to move toward the PMR layer 234 and may proceed in a direction parallel to the reflection layer 232. Accordingly, the supporting portion 30 may be installed in spaces between adjacent light source arrays.

The supporting portions 30 may be formed in shapes that progressively narrow toward the top. That is, by forming the supporting portion 30 to have an inclined outer surface, the light radiated from the light sources 24, the light reflected by the reflection layer 232, and the light re-reflected by the PMR layer 234 can be made to be refracted and totally reflected in many directions.

While the cross-sectional shape of the supporting portion 30 is shown as being a round cross section, it may be a polygonal cross section with 3 or more sides. By forming the supporting portion 30 to have a polygonal cross section, incident light may be refracted and reflected in many directions.

The top surface of the supporting portion 30 may be pressed against the reflection region 234a of the PMR layer 234, in order not to impede transmission of light from the PMR layer 234 to the diffusion layer 235.

Each of the supporting portions 30 may be positioned in a region that is ½ the distance between adjacent light source arrays in the Y-axis direction and/or in a region that is ½ the distance between adjacent light source arrays in the X-axis direction, to stably support the PMR layer 234. However, the arranged positions of the supporting portions 30 are not limited to those in embodiments.

A description will be provided below of a reflection surface structure capable of blocking or minimizing loss of light radiated from the light sources, through leaking laterally to the sides of the backlight unit.

Figure 21:
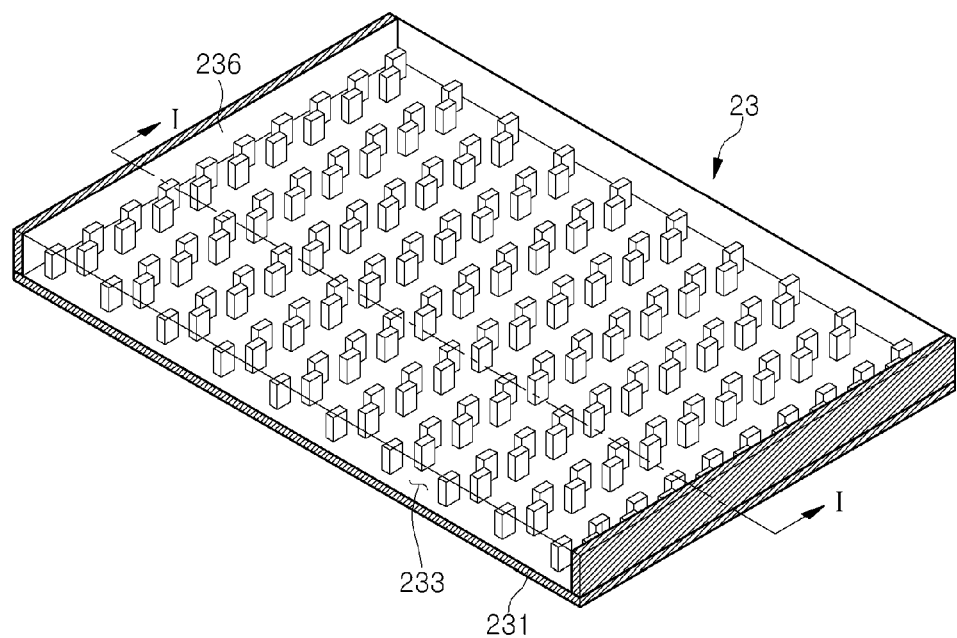
FIG. 21 is a perspective view illustrating a backlight unit structure provided with a reflection layer according to an embodiment.
Figure 22:
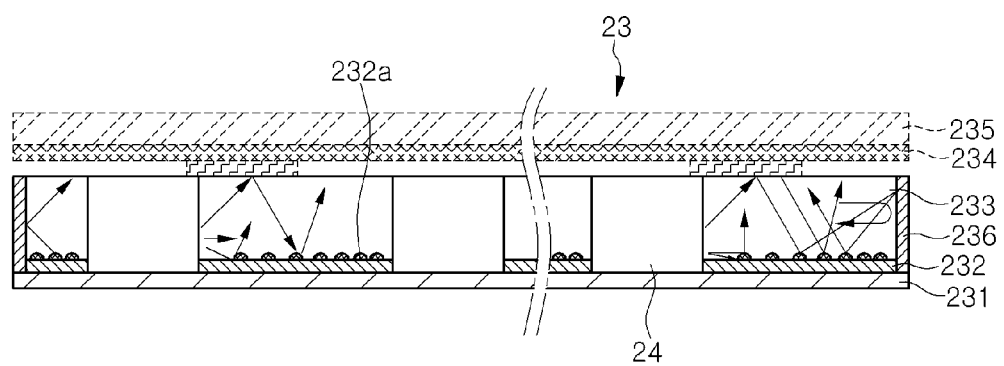
FIG. 22 illustrates a sectional view of FIG. 21 taken along line I-I.

FIG. 21 is a perspective view illustrating a backlight unit structure provided with a reflection layer according to an embodiment, and FIG. 22 illustrates a sectional view of FIG. 21 taken along line I-I.

Referring to FIGS. 21 and 22, a reflection surface 236 is formed on at least one side surface of a vacant layer 233 configuring the backlight unit 23, in order to reflect or diffuse light, which moves to the side surface of the vacant layer 233 and is lost, into the diffusion layer.

Thus, light that passes through the side surface of the vacant layer 233 and is lost is re-reflected into the vacant layer 233, and is re-diffused within the vacant layer 233, in order to greatly increase light use efficiency.

The reflection surface 236 may be formed and provided using the same method as with the light extraction layer 232 formed on the top surface of the circuit board layer 231. That is, the reflection surface 236 may include at least one from a reflective material of metal or a metal oxide, and may be a reflection sheet or mirror sheet including a metal or metal oxide having high reflectivity—for example, aluminum (Al), silver (Ag), gold (Au), and titanium oxide (TiO2).

Figure 23:
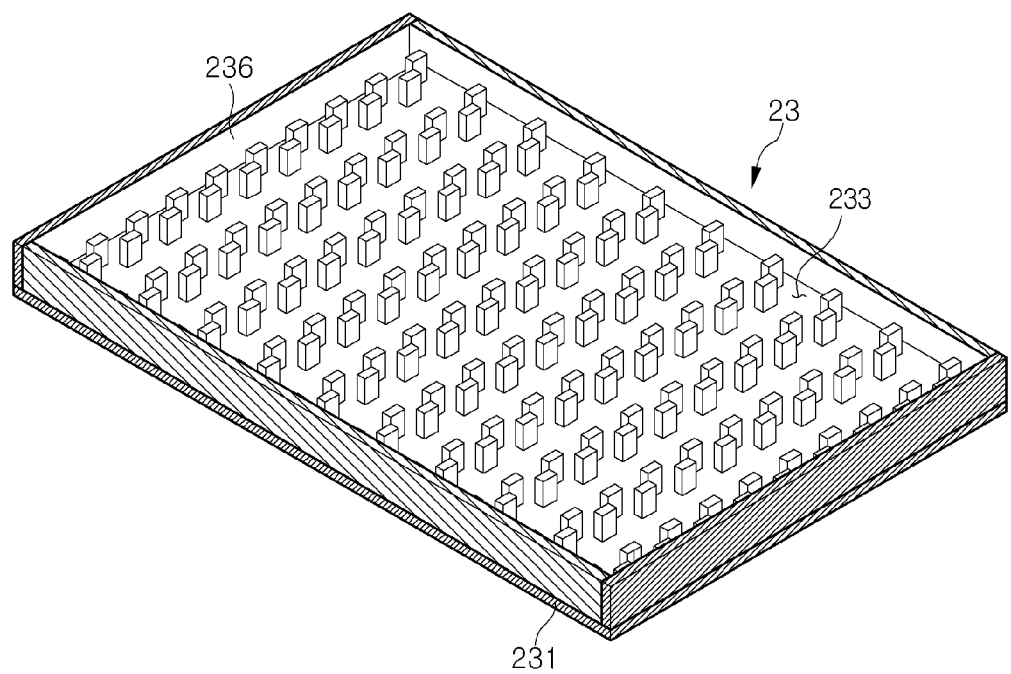
FIG. 23 is a perspective view illustrating a reflection surface formed on all four sides of the vacant layer.

FIG. 23 is a perspective view illustrating a reflection surface formed on all four sides of the vacant layer.

Referring to FIG. 23, the reflection surface 236 may be formed on all four side surfaces of the vacant layer 233, as is evident from the embodiments in FIGS. 7 and 8.

Below, description will be provided of specific embodiments for constituting the present invention, where same elements as in the above will be assigned same reference numerals, and repetitive description thereof will not be provided.

Figure 24:
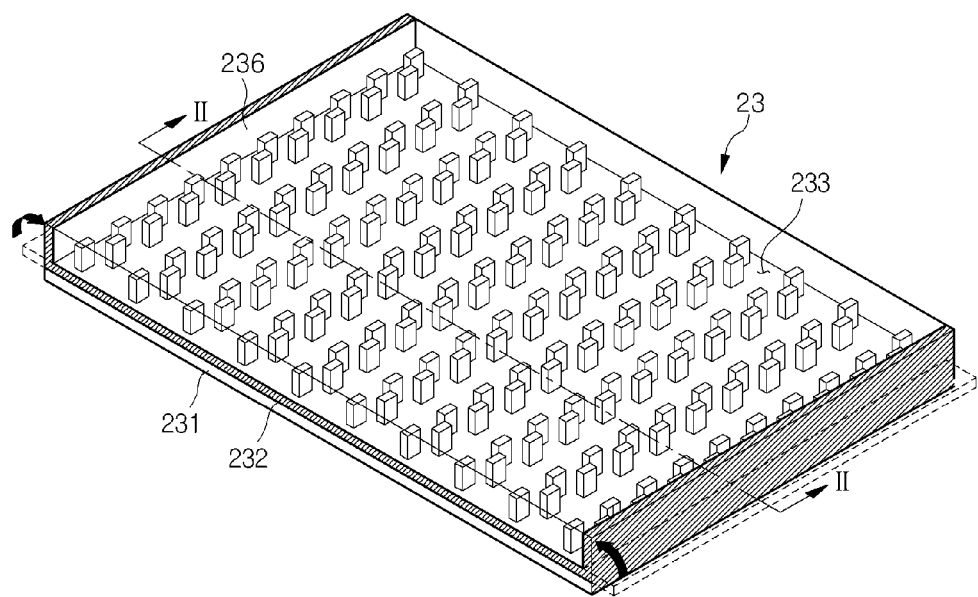
FIG. 24 illustrates a perspective view of a backlight unit provided with a reflection surface according to a first embodiment.
Figure 25:
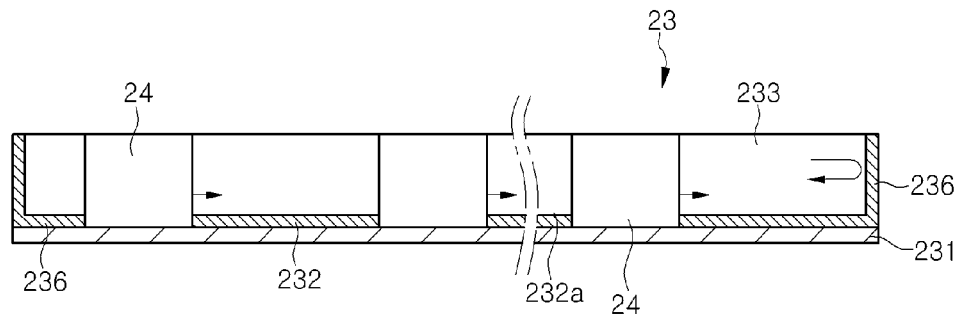
FIG. 25 illustrates a sectional view of FIG. 24 taken along line II-II.

FIG. 24 illustrates a perspective view of a backlight unit provided with a reflection surface according to a first embodiment, and FIG. 25 illustrates a sectional view of FIG. 24 taken along line II-II.

Referring to FIGS. 24 and 25, a reflection surface 236 is formed by bending a portion of the light extraction layer 232.

In detail, a reflection sheet forming the light extraction layer 232 is formed larger than the circuit board layer 231 or the vacant layer 233, and is made to extend further from the edge of the circuit board layer 231 or the vacant layer 233. Also, the extended portion of the reflection sheet is folded and raised to close the side surfaces of the vacant layer 233.

Figure 26:
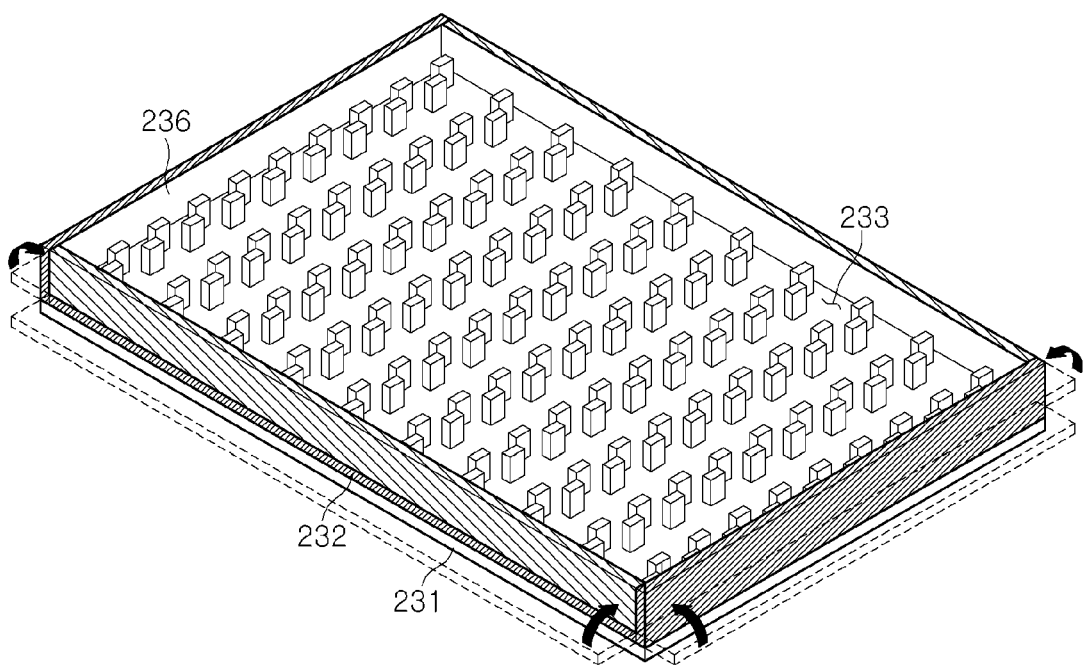
FIG. 26 is a perspective view illustrating a reflection surface formed on all four sides of a vacant layer according to the first embodiment.

FIG. 26 is a perspective view illustrating a reflection surface formed on all four sides of a vacant layer according to the first embodiment.

As shown in FIG. 26, the four edge portions of the light extraction layer 232 may all be bent to enclose all the side surfaces of the vacant layer 233.

Figure 27:
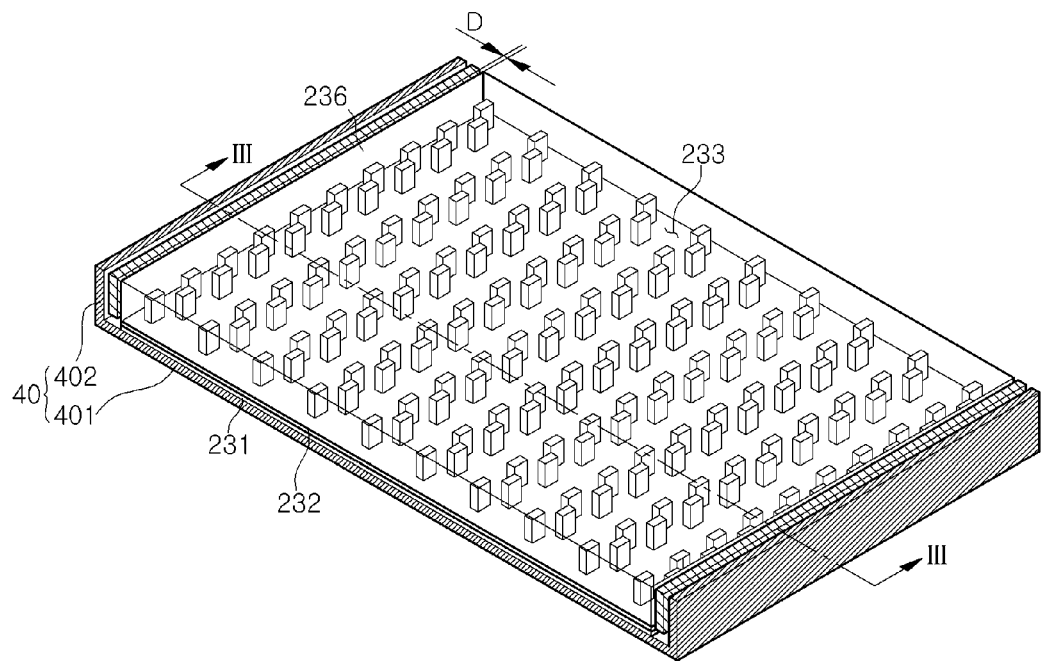
FIG. 27 illustrates a perspective view of a backlight unit provided with a reflection surface according to a second embodiment.
Figure 28:
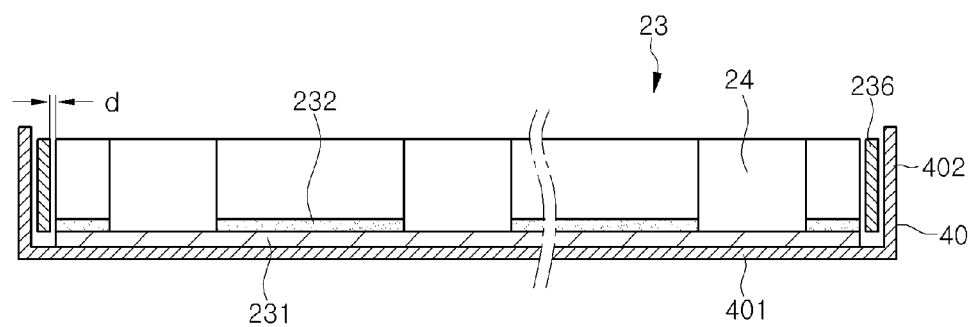
FIG. 28 illustrates a sectional view of FIG. 27 taken along line III-III.

FIG. 27 illustrates a perspective view of a backlight unit provided with a reflection surface according to a second embodiment, and FIG. 28 illustrates a sectional view of FIG. 27 taken along line III-III.

Referring to FIGS. 27 and 28, in order to form the reflection surface 236, a separate reflection sheet having a size corresponding to the side surface size of the vacant layer 233 may be provided at the side surfaces of the vacant layer 233.

In detail, a reflection sheet provided as a separate product to perform the function of the reflection surface 236, as shown in the drawings, may be positioned a predetermined distance d apart from a side surface of the vacant layer 233. The distance d between the reflection surface 236 and the vacant layer 233 may be 2 mm or less. If the distance d is too great, light loss can occur through the gap thereby formed, so the separated distance must properly be selected.

In more detail, the back cover 40 is formed of a body portion 401 supporting the circuit board layer 231, and a side surface portion 402 enclosing at least a portion of the side surfaces of the display module 20. The side surface portion 402 is formed by bending the edges of the body portion 401.

The reflection surface 236 according to the present embodiment is placed between the side surface of the vacant layer 233 and the side surface portion 402 of the back cover 40, to be provided in a position separated from the side surface of the vacant layer 233. Here, the side surface of the vacant layer 233 denotes the diffusion layer 235 positioned on the top of the vacant layer 233 or a vertical surface extending from the edge of the circuit board layer 231. That is, when the diffusion layer 235, the display panel 21, or the circuit board layer 231 is formed smaller than the side surface of the back cover 40, a separated space can be formed between the vacant space 233 and the side surface of the back cover 40.

Here, in order to space the reflection surface 236 a predetermined distance d from the side surface of the vacant layer 233, the following method may be applied.

First, as a method of separating the reflection surface 236 from the vacant layer 233, a spacer may be interposed between the side surface of the vacant layer and the reflection surface 236.

Second, a separate holding member such as a bracket may be used to maintain a state of separation of the reflection surface 236 from the vacant layer 233 from the outer periphery of the display module 20.

Third, the reflection surface 236 may be adhered to the side surface portion 402 of the back cover 40 and made to maintain a separated state from the side surface of the vacant layer 233. As a method for adhering the reflection surface 236 to the side surface portion 402 of the back cover 40, the use of an adhesive may be suggested.

In addition to the methods suggested above, a wide array of methods may be suggested for separating the reflection surface 236 from the side surface of the vacant layer 233, and it will be understood that the characteristic feature of the present invention put forth in the present embodiment is maintaining the reflection surface 236 in a state separated from the side surface of the vacant layer 233.

Figure 29:
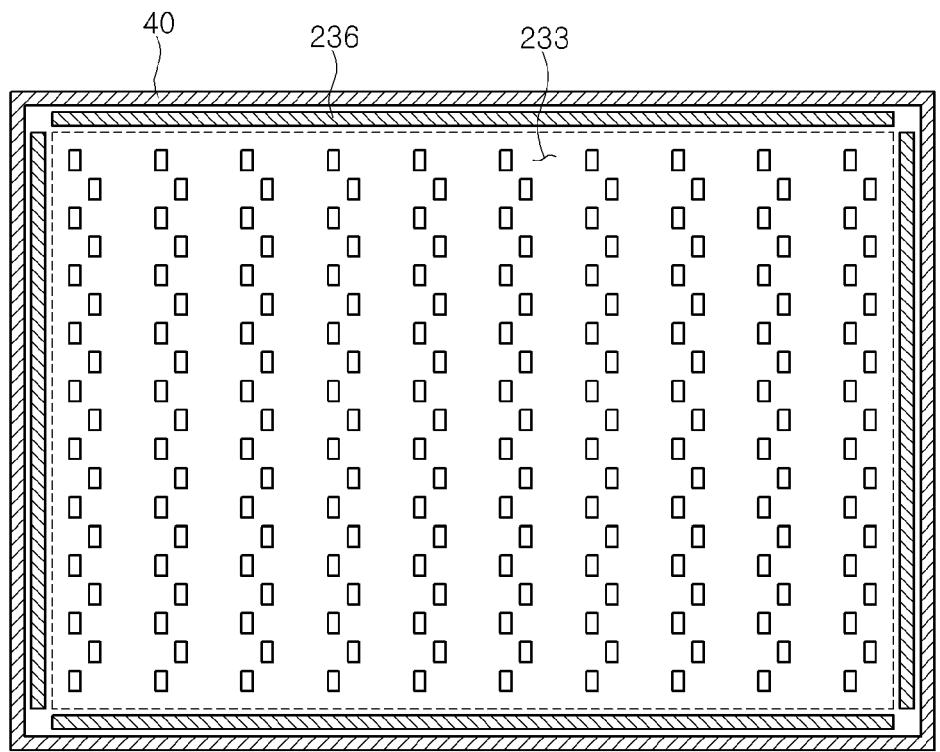
FIG. 29 is a plan view illustrating a reflection surface formed on all four sides of a vacant layer.

FIG. 29 is a plan view illustrating a reflection surface formed on all four sides of a vacant layer.

As shown in FIG. 29, the side surface portion 402 of the back cover 40 encloses all four side surfaces of the vacant layer 233, and the reflection surfaces 236 may all be interposed between the side surface portion 402 and the side surface of the vacant layer 233.

As discussed above, the reflection surface 236 may be provided on the side surface of the vacant layer 233 using various methods.

Below, several embodiments on the configuration of the reflection surface 236 that is pressed against the side surface of the vacant layer 233 will be described. Also, it will be noted that the surface configuration of the reflection surface set forth below may be applied in the same manner as the reflection surface 236 according to the first and second embodiments, regardless of how it is provided.

Figure 30:
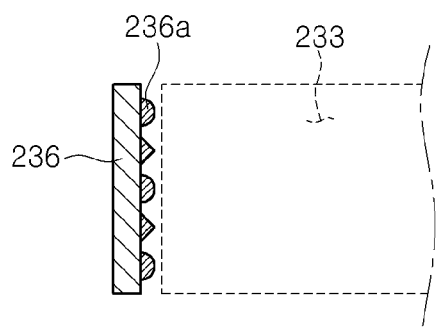
FIG. 30 is an enlarged sectional view illustrating the form of a reflection surface according to the first embodiment.

FIG. 30 is an enlarged sectional view illustrating the form of a reflection surface according to the first embodiment.

Referring to FIG. 30, roughness is given to the inner surface of the reflection surface 236, or the surface facing the vacant layer 233, so that light proceeding toward the outside of the vacant layer 233 may be scattered and reflected into the vacant layer 233.

In detail, with a reflection pattern 236a of a projecting configuration regularly or irregularly printed on the inner surface of a reflection sheet that performs the function of the reflection surface 236, it may be provided on the side surface of the vacant layer 233. The projections may include polygonal cone shapes that include semispherical shapes and triangular cones. Also, single projections may be printed on the reflection pattern 236a, and other forms of projections may be mixed in the printing.

While in the present embodiment, the projections are shown forming an embossed type of reflection pattern 236a, conversely, the reflection pattern 236a may of course be formed intaglio on a reflective sheet.

Figure 31:
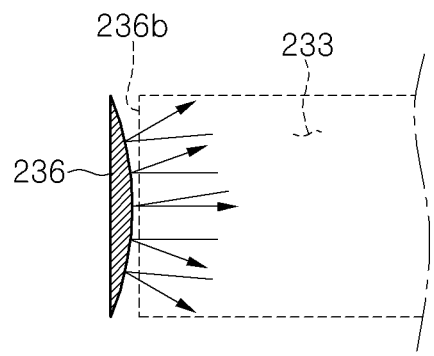
FIG. 31 is an enlarged sectional view illustrating the form of a reflection surface according to the second embodiment.

FIG. 31 is an enlarged sectional view illustrating the form of a reflection surface according to the second embodiment.

Referring to FIG. 31, a reflection surface 236 according to an embodiment may be formed in a convex mirror configuration.

In detail, the inner surface of the reflection surface 236 facing the side surface of the vacant layer 233 may be formed as a convex surface 236b performing the function similar to a convex mirror. Here, the convex surface 236b does not need to have a rate of curvature that focuses at a certain point, and is sufficient when it simply re-reflects light progressing toward the reflection surface 236 back to the inside of the vacant layer 233. That is, when light meeting the convex surface 236b is re-reflected into the vacant layer 233, and is made to be re-reflected in many directions, it is sufficient.

Also, while the convex surface 236b may be formed on the inner surface of the reflection surface 236, it may also be formed on the outer surface. However, the convex surface 236b may be formed on an opposite surface to a surface facing the side surface of the vacant layer 233.

Figure 32:
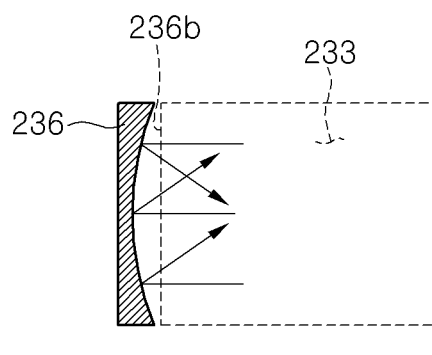
FIG. 32 is an enlarged sectional view illustrating the form of a reflection surface according to a third embodiment.

FIG. 32 is an enlarged sectional view illustrating the form of a reflection surface according to a third embodiment.

Referring to FIG. 32, a reflection surface 236 according to an embodiment may be provided in the form of a concave mirror.

In detail, the inner surface of the reflection surface 236 facing the side surface of the vacant layer 233 may be formed in the shape of a concave surface 236c performing a function similar to a concave mirror.

Like the embodiment illustrated in FIG. 12, in the present embodiment, the concave surface 236c does not necessarily have to have a curvature with a focal point, and may also be formed on the outer surface of the reflection surface 236.

Figure 33:
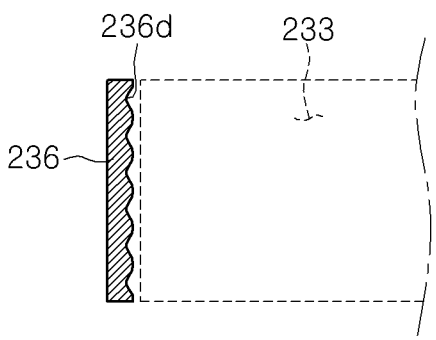
FIG. 33 is an enlarged sectional view illustrating the form of a reflection surface according to a fourth embodiment.

FIG. 33 is an enlarged sectional view illustrating the form of a reflection surface according to a fourth embodiment.

Referring to FIG. 33, the inner surface of the reflection surface 236 according to an embodiment may form a concavo-convex portion 236d, as shown in the drawing.

In detail, while the reflection pattern 236a shown in FIG. 11 is configured with a plurality of projections or recesses regularly or irregularly scattered, the concavo-convex portion 236d in the present embodiment is characterized by a configuration with a crest portion and a trough portion alternately formed in continuation. Also, the concavo-convex portion 236d may extend in one of a lengthwise direction and a widthwise direction.

A display apparatus configured as above according to embodiments may have the following effects.

First, by applying a PMR (Patterned Metal Reflector) layer according to embodiments, color uniformity may be improved.

Second, by removing a projection functioning as a conventional light guide layer, making the display module lightweight may be achieved, and manufacturing cost may also be reduced.

Third, by removing the light guide layer of resin material, the reflection sheet that causes problems, and the reflection pattern of white ink material that causes light scattering, light use efficiency is greatly increased, and improved brightness and color uniformity can be obtained.

Fourth, by increasing brightness, high picture quality can be achieved to ensure product competitiveness.

Fifth, by removing a conventional light guide layer material, it is possible to make the display module ultra-thin.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display apparatus comprising a display panel, and a backlight unit supplying light from a rear of the display panel, wherein the backlight unit comprises:
   a plurality of light source arrays;
   a circuit board layer on which the plurality of light source arrays are seated;
   a first reflection layer formed on the circuit board layer, for reflecting light emitted from the plurality of light source arrays;
   a pattern layer positioned on a top surface of the plurality of light source arrays; and
   a vacant layer formed between the first reflection layer and the pattern layer,
   wherein the vacant layer includes an air layer or a vacuum layer, and the pattern layer includes a second reflection layer having a reflection region that reflects light and a transmission region that transmits light, the second reflection layer including a plurality of holes to transmit the light from the plurality of light source arrays,
   wherein the backlight unit further comprises:
      a plurality of supporting portions interposed between the first reflection layer and the second reflection layer to prevent the pattern layer from drooping, and
      a reflection surface formed on at least one side surface of the vacant layer configuring the backlight unit,
   wherein the plurality of supporting portions are configured to upwardly protrude from the first reflection layer and to be disposed in spaces between the plurality of light source arrays,
   wherein the plurality of supporting portions are configured to be transparent,
   wherein the plurality of light source arrays include:
   a plurality of first arrays, each array having a plurality of first light sources which are disposed with a predetermined distance away from each other, the light emitting surface of the first light sources facing a first direction; and
   a plurality of second arrays, each array having a plurality of second light sources which are disposed with a predetermined distance away from each other, the light emitting surfaces of the second light sources facing a second direction,
   wherein the first arrays and the second arrays are alternately arranged in a third direction which is perpendicular to the first and second directions,
   wherein the first direction and the second direction are in parallel and opposite to each other, and
   wherein each first light source of the first array is disposed between adjacent second light sources in the third direction, and each second light source of the second array is disposed between adjacent first light sources in the third direction.

2. The display apparatus as claimed in claim 1, wherein specular reflection occurs without total reflection or refraction of light at a boundary region between the vacant layer and the second reflection layer, and at a boundary region between the vacant layer and the first reflection layer.

3. The display apparatus as claimed in claim 1, wherein the reflection region of the second reflection layer and the first reflection layer include a metallic reflection material or a dielectric multi-layer with uniform reflectivity and high reflectivity.

4. The display apparatus as claimed in claim 3, wherein the first reflection layer further includes a reflection pattern formed on a top surface thereof to control a reflection angle of light, the reflection pattern including a metallic reflection material or a dielectric multi-layer.

5. The display apparatus as claimed in claim 1, wherein the second reflection layer is a reflection/transmission modulation film defining a transmission hole for transmission of light, formed on a film of a metallic reflection material.

6. The display apparatus as claimed in claim 1, wherein the second reflection layer is a reflection/transmission modulation film formed of a structure in which a metallic reflection material for specular reflection is applied on a portion of a transparent film.

7. The display apparatus as claimed in claim 6, wherein the metallic reflection material is applied on the transparent film, through one of deposition, coating, and printing methods.

8. The display apparatus as claimed in claim 1, further comprising a diffusion layer of an optical sheet configuration on a top surface of the second reflection layer, wherein the second reflection layer is a reflection pattern that is deposited, coated, or printed on an undersurface of the diffusion layer.

9. The display apparatus as claimed in claim 1, wherein one of the reflection region and the transmission region of the second reflection layer converges in plurality to form a pattern, and the pattern is arranged repetitively with regularity.

10. The display apparatus as claimed in claim 1, wherein the reflection surface includes at least one of a reflective sheet of metal or a metal oxide having aluminum, silver, gold, or titanium oxide.

11. The display apparatus as claimed in claim 1, wherein the reflection surface is formed on four side surfaces of the vacant layer.

12. The display apparatus as claimed in claim 1, wherein the reflection surface is formed by bending a portion of the first reflection layer.

13. The display apparatus as claimed in claim 1, wherein the reflection surface is a separate reflection sheet having a size corresponding to the side surface size of the vacant layer.

14. The display apparatus as claimed in claim 13, wherein the reflection sheet is positioned a predetermined distance apart from a side surface of the vacant layer.

15. The display apparatus as claimed in claim 1, further comprising a reflection pattern of projecting configuration regularly or irregularly printed on the inner surface of a reflection sheet.

16. The display apparatus as claimed in claim 15, wherein the projecting configuration forming the reflection pattern includes polygonal cone shapes that include at least one of semispherical shapes and triangular cones, and
  wherein the reflection pattern is formed of a singular shape of projections or a mixture of different shapes of projections.

17. The display apparatus as claimed in claim 15, wherein an inner surface of the reflection surface facing the side surface of the vacant layer is formed as a convex surface or a concave surface.

18. The display apparatus as claimed in claim 1, wherein the plurality of supporting portions are formed in shapes that progressively narrow towards the tops of the plurality of supporting portions.

19. The display apparatus as claimed in claim 18, wherein the plurality of supporting portions have a polygonal or a round typed horizontal cross section.

20. The display apparatus as claimed in claim 1, wherein the plurality of supporting portions have a polygonal or round typed horizontal cross section.

* * * * *